No. 665,723. Patented Jan. 8, 1901.
W. A. BARROWS.
TIRE.
(Application filed July 16, 1900.)
(No Model.)
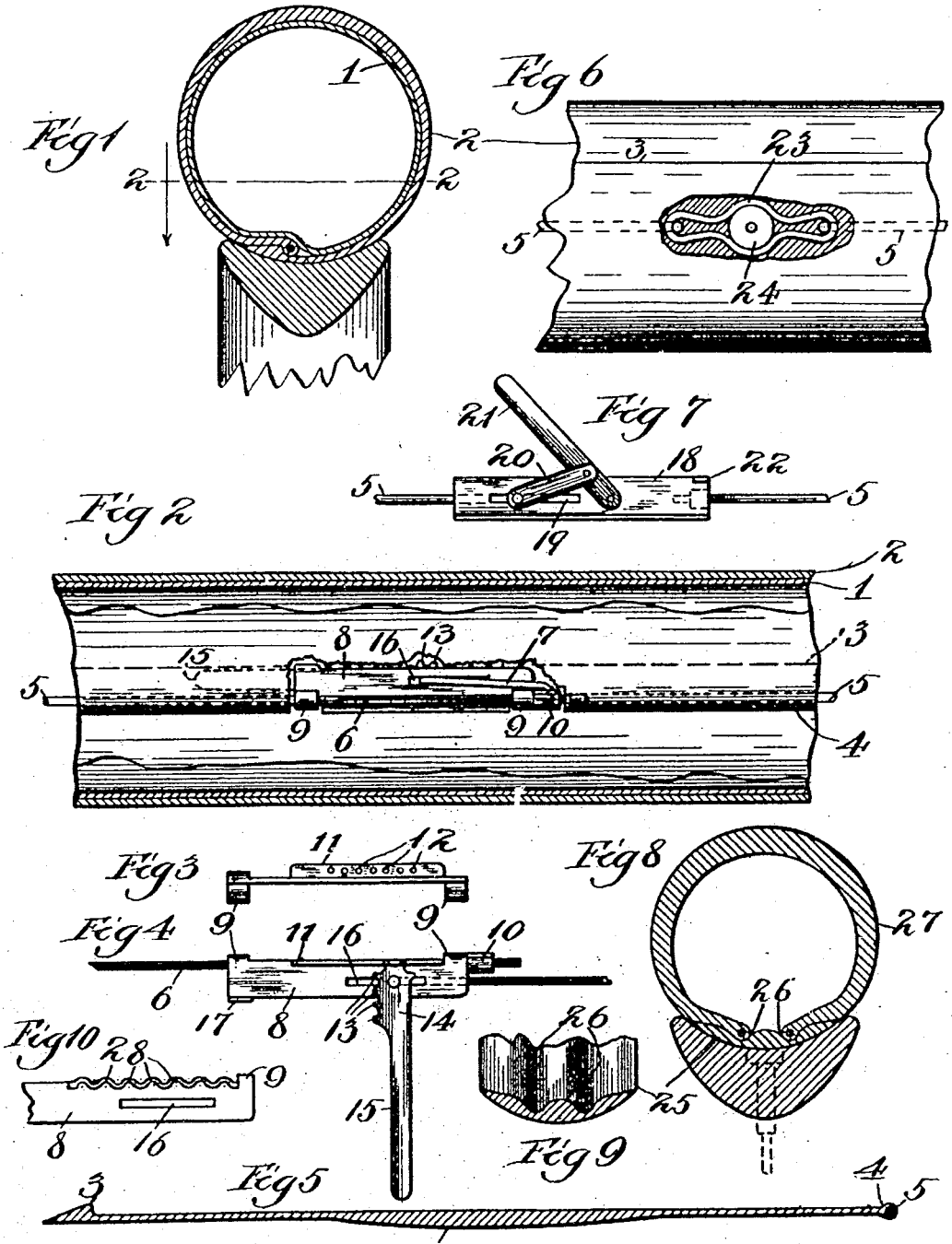
Witnesses
W. C. Coolish
L. E. Serage
Inventor
Walter A. Barrows
By Coburn, Hibben & McElroy
Attys

UNITED STATES PATENT OFFICE.

WALTER A. BARROWS, OF CHICAGO, ILLINOIS.

TIRE.

SPECIFICATION forming part of Letters Patent No. 665,723, dated January 8, 1901.

Application filed July 16, 1900. Serial No. 23,777. (No model.)

*To all whom it may concern:*

Be it known that I, WALTER A. BARROWS, a resident of Chicago, in the county of Cook and State of Illinois, have invented certain new and useful Improvements in Tires, of which the following is a specification.

My invention pertains to vehicle-tires generally; and its object is to provide suitable and efficient means whereby a tire may be mechanically attached and detached from a rim without necessarily using a specially-prepared rim, but even using the ordinary or plain crescent rim.

In the drawings, Figure 1 is a section of a tire and rim; Fig. 2, a sectional plan on line 2 of Fig. 1 with the inner tube and casing cut away so as to expose the connector or wire-tightener; Figs. 3 and 4, detail views of the connector; Fig. 5, a section of the casing when laid out flat; Fig. 6, an elevation of the under side of the casing partially broken away to show an eye to connect the wires around the valve-stem; Fig. 7, an elevation of a modified construction of connector; Fig. 8, a section of a tire and rim, showing the use of two wires; Fig. 9, a detail view showing the strip preferably used in the socket of the crescent rim when two wires are employed; and Fig. 10 a modified construction of a connector, showing corrugations used in lieu of the holes illustrated in Fig. 3.

As shown, the tire has an inner tube 1 and an outer casing 2, the latter being provided at or near one edge with a bead 3 to receive the other edge 4 of the casing, in which is arranged the wire 5. The two ends 6 and 7 of the wire are connected to a wire-tightener, so that when tightened and held in that condition the tire will be securely attached to the rim. The wire-tightener comprises a plate 8, having suitable means for holding one end of the wire. As shown, two loops or lugs 9 are formed from the plate, from which loops the end 6 of the wire passes, and is adjustably held thereto by a nut 10 screwing on the threaded end of the wire. The plate 8 has a flange 11, provided with a series of holes 12 (or with corrugations 28, as shown in Fig. 10) to receive the teeth 13 of a walking-lever 14, which is provided with an operating-handle 15. The other end 7 of the wire is riveted or otherwise secured to the lever and forms the pivot thereof. This pivot is shiftable or movable in a longitudinal slot 16, so that the wire is tightened or loosened, accordingly as the lever walks in the one direction or the other. This lever belongs to the second class of levers, the fulcrum being at one end, the power at the other end, and the weight, which is here the wire, is arranged therebetween.

It will be understood that the edge of the casing is cut away to expose the wire and to admit the lugs or ears 9, the plate being located on the under side of the casing.

A catch may be provided to hold the lever in place, and a similar arrangement for this purpose consists of a lug or projection 17 at one end of the plate, behind which the lever may be sprung when the wire is tightened or released therefrom when the wire is to be loosened. When the lever or handle of the tightener is in the position shown in Fig. 2, the wire is tightened and the degree of tension is varied or adjusted by regulating the adjusting-nut on the screw-threaded wire; but when the lever is swung at an angle to the plate, as illustrated in Fig. 4, the wire is loosened, because one end of the wire is permitted to travel toward the right-hand end of the slot, Fig. 4.

The tightener lies comparatively flat between the parts of the outer casing and the rim, and the lever works flat therebetween. When the tire is deflated, the lever can be easily operated, and the tire can be readily attached or detached. It is to be observed that it is unnecessary to specially prepare a rim, but that the device is applicable to the ordinary plain crescent-shaped rim—in fact, to any kind of rim.

In Fig. 7 is shown a modified form of construction operating on the same general principle as the tightener just described. In this form the threaded end of the wire may be secured to a plate 18, substantially as before; but the other end of the wire, which is bent at right angles and extends through the slot 19, is riveted or secured to a link 20, which is connected to a lever 21, intermediate of its length, such lever being pivoted at one end to the plate. When the lever is shifted to the right, Fig. 7, the wire is tightened, and when in extreme position the lever becomes locked by reason of the construction of the levers. This plate may also be provided with a catch 22.

The wire may be in a continuous strip or strand, or, if desired, it may be formed in two pieces, with an eye 23, which is preferably, though not necessarily, molded into the casing and which extends on either side of the usual hole 24 in the rim to accommodate the stem of the valve. This arrangement is preferably for the reason that the wire is brought to the center of the rim and without interfering with the valve-stem. However, it will be understood that when the term "a wire" is used in the claims such wire may be a single strand or piece or may be two strands, with a connecting-eye, except in those claims expressly mentioning the two strands with the connecting-eye.

Instead of a single wire two wires may be used, with two separate tightening devices. The double arrangement is shown in Fig. 8 and is of advantage in large tires—as, for instance, those used on tandems and automobiles. To provide a bead for the wired edges of the outer casing 27, a strip 25, having grooves 26, may be arranged in the rim either loosely or cemented thereto. These grooves perform the same office as the bead 3 on the casing illustrated in Fig. 5. The use of this strip dispenses with grooves on the rim when double wires are used, so that the tire, with its wire-tightener, can be applied to any form of rim, and in some cases this strip may be dispensed with altogether.

My invention provides a reliable and efficient construction of tire of the mechanically-detachable class. The operations are very simple, the tire being readily detached or attached by the movement of the lever in the one direction or the other. Moreover, my invention has the additional advantage that it is applicable to any form of rim without any special preparation thereof.

I claim—

1. In a tire, the combination with the casing having a wire in one of its edges, of means for tightening such wire comprising a plate to which one end of the wire is secured and having a slot and a member movable on such plate, the other end of the wire passing through said slot and being secured to such member.

2. In a tire, the combination with the casing having a wire in one of its edges, of means for tightening such wire comprising a plate to which one end of the wire is secured and a walking-lever which moves longitudinally on the plate and to a shifting point on which the other end of the wire is pivoted.

3. In a tire, the combination with the casing having a wire in one of its edges, of a wire-tightener comprising a plate to which one end of the wire is secured, and a lever of the second class whose fulcrum shifts on the plate and to which the other end of the wire is pivotally connected, such pivotal point moving longitudinally of the plate.

4. In a tire, the combination, with the casing having a wire in one of its edges, of a wire-tightener comprising a plate to which one end of the wire is secured, a lever engaging the plate so as to walk thereon and to which lever the other end of the wire is secured and means for regulating the tension of the wire with the same throw of lever.

5. In a tire, the combination with the casing having a wire in one of its edges, of a wire-tightener comprising a plate to which one end of the wire is secured, and a lever whose fulcrum is movable on the plate and having a shifting pivotal point to which the other end of the wire is secured.

6. In a tire, the combination with the casing having a wire in one of its edges, of a wire-tightener comprising a plate to which one end of the wire is secured and having a longitudinal slot, and a walking-lever device on the plate and pivotally connected to the other end of the wire for reciprocating the same in the slot.

7. In a tire, the combination with a casing having a wire in one of its edges, of a wire-tightener comprising a plate to which one end of the wire is secured, a walking-lever to which the other end of the wire is pivotally connected and means on said plate, with which means the lever engages so as to walk longitudinally of the plate and shift said pivotal point of connection of the wire and lever.

8. In a tire, the combination, with the casing having a wire in one of its edges, of a wire-tightener comprising a plate to which one end of the wire is secured and having a longitudinal slot, and a walking-lever connected to the other end of the wire which passes through the slot and having marginal teeth engaging the plate.

9. In a tire, the combination, with the casing having a wire in one of its edges, one end of the wire being threaded, of a wire-tightener comprising a plate having an end flange through which the threaded end of the wire passes, an adjusting-nut on such end of the wire and bearing against the flange and means on the plate for shifting the other end of the wire to tighten or loosen the wire.

10. In a tire, the combination, with the casing having a wire in one of its edges, of a tightener comprising a plate to which one end of the wire is secured and having a longitudinal slot and also a flange provided with a series of holes, a lever pivoted to the other end of the wire which passes through the slot and having marginal teeth engaged by such holes.

11. In a tire, the combination with the rim and a casing having a wire in one of its edges, of a tightener comprising a plate removable from and independent of the rim, to which plate one end of the wire is secured, and a lever to which the other end of the wire is pivotally connected, which lever walks along the plate and shifts the pivotal point of the wire connected thereto.

WALTER A. BARROWS.

Witnesses:
CLARA M. BARROWS,
SAMUEL E. HIBBEN.